No. 860,315. PATENTED JULY 16, 1907.
D. T. McNIEL.
SEPARABLE PULLEY.
APPLICATION FILED AUG. 31, 1906.
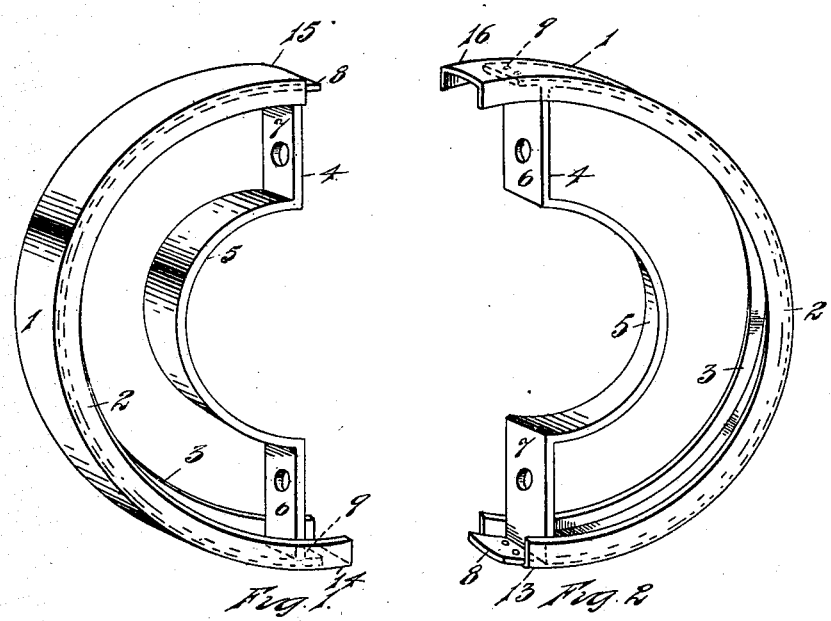
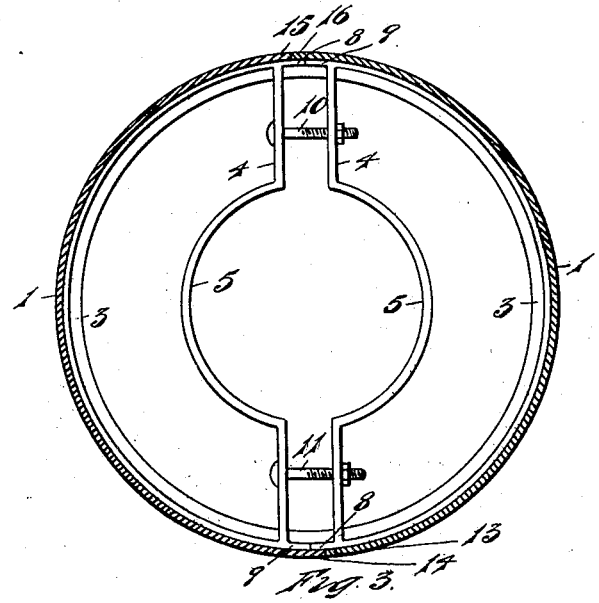
WITNESSES
INVENTOR
Daniel T. McNiel
By Parker & Burton, Attorneys.

UNITED STATES PATENT OFFICE.

DANIEL T. McNIEL, OF DETROIT, MICHIGAN.

SEPARABLE PULLEY.

No. 860,315.　　　　Specification of Letters Patent.　　　　Patented July 16, 1907.

Application filed August 31, 1906. Serial No. 332,755.

*To all whom it may concern:*

Be it known that I, DANIEL T. McNIEL, a citizen of the United States, residing at Detroit, county of Wayne, State of Michigan, have invented a certain new and useful Improvement in Separable Pulleys; and I declare the following to be a full, clear, and exact description of the same, such as will enable others skilled in the art to which it pertains to make and use the same, reference being had to the accompanying drawings, which form a part of this specification.

This invention relates to separable pulleys, and has for its object an improved pulley in which the contiguous ends of the two sections of the pulley rest on, and are supported by, the same arm, thereby holding the two sections securely together, and maintaining them in their accurately round shape.

In the drawings:—Figures 1 and 2 are perspectives showing the two halves of the pulley. Fig. 3, is a sectional elevation showing the assembled pulley.

The pulley in which this invention is embodied is made in two symmetrical halves. Each half of the pulley is made with a semicircular rim 1, provided with flanges 2 and 3. Each half is braced by an arm 4 which has a circular middle part 5 to engage the shaft or bushing, radial parts 6 and 7 and footings 8 and 9 which engage against the inner surface of the separable rim part 1. The arm part is arranged with respect to the separable rim part so that the footing 8 projects beyond the end of the rim and the footing 9 is withdrawn within the cavity between the face and flanges of the circular part 1. The circular rim part 1 and its complementary part form, when assembled, a complete circle with the contiguous ends of the halves lapping onto a single footing composed of the parts 8 and 9, the ends 13 and 14 of the rim being brought into close contact at one joint, and the ends 15 and 16 at the other. Each arm is riveted securely to that portion of the separable rim part with which it is connected and underlies the end of the adjacent rim part of its complementary half circle, making a strong unyielding interlocking joint at the meeting rim of the two rim parts. The parts are secured together by bolts 10 and 11.

What I claim is:—

1. In combination with the individual halves of a bisected rim, each having inwardly extending flanges along its lateral edges, a footing engaging against the concave surface of each, said footing projecting at one end of each half and being correspondingly retracted at the other end, and having bracing arms extending from end to end of each half, the center portion of each arm being bent to a position of parallelism with its rim to permit its engagement about a shaft, and means extending through the bracing arms of each half whereby they are held together and about a supporting shaft, substantially as described.

2. A separable pulley, consisting of the complementary halves of a circular rim, each having inwardly projecting lateral flanges, a footing fixed to the concave surface of each rim and extending across the open side of the half, that portion of the footing on the rim projecting somewhat at one end and being correspondingly terminated within the other end, and the central portion of the transversely extending part of the footing being bent to a position of parallelism with the rim to permit its engagement about a shaft or bushing, and means for holding said halves together, substantially as described.

3. A separable pulley, having in combination with the halves of a circular rim, each having inwardly extending lateral flanges, a reinforcing footing engaging the inner face of each half of said rim and each footing section having a portion extending from one end to the other thereof and adapted for engagement about a shaft or bushing, and there being a projecting portion from one end of each footing adapted to project into a receiving space in one end of the other half of the rim to lock the parts in place against deflection, and bolts passing through the diametrical portions of the footing of each half whereby they are drawn together and about a supporting shaft, substantially as described.

In testimony whereof, I sign this specification in the presence of two witnesses.

DANIEL T. McNIEL.

Witnesses:
LOTTA LEE HAYTON,
CHARLES F. BURTON.